June 6, 1961  G. A. STEIN  2,987,419
METHOD OF APPLYING COATING MATERIAL TO ARTICLES
Original Filed June 23, 1954
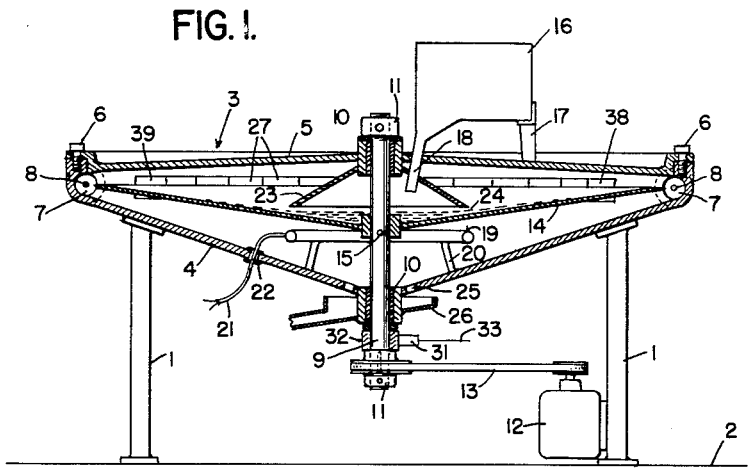
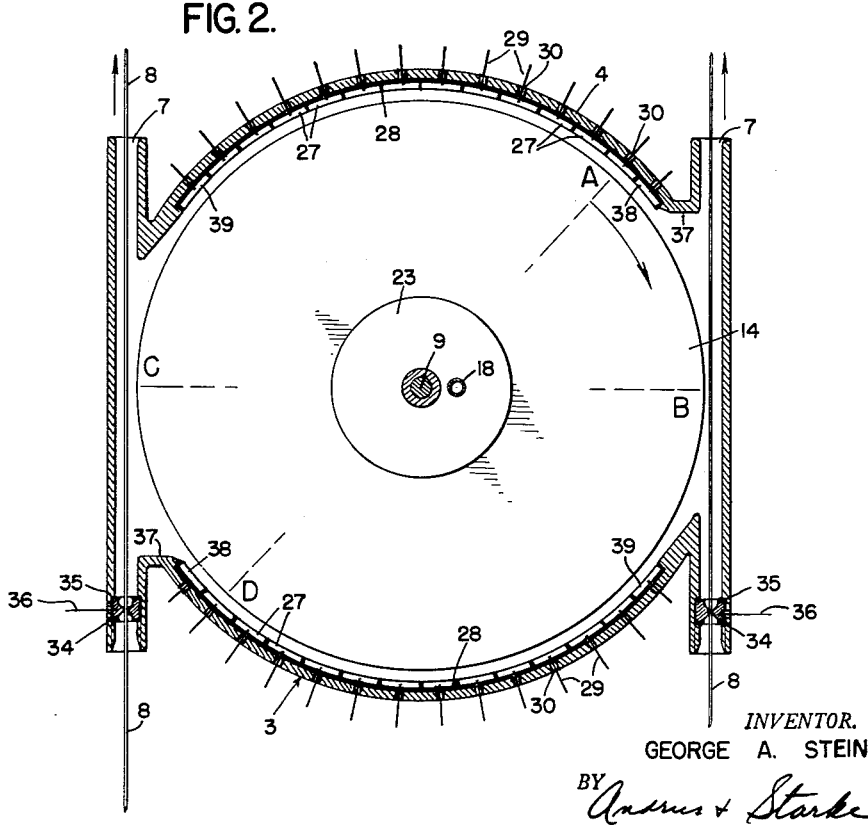
INVENTOR.
GEORGE A. STEIN
Attorneys

United States Patent Office 2,987,419
Patented June 6, 1961

2,987,419
METHOD OF APPLYING COATING MATERIAL TO ARTICLES

George A. Stein, Menominee Falls, Wis., assignor to A. O. Smith Corporation, Milwaukee, Wis., a corporation of New York
Original application June 23, 1954, Ser. No. 438,766, now Patent No. 2,865,324, dated Dec. 23, 1958. Divided and this application Jan. 24, 1958, Ser. No. 710,917

5 Claims.  (Cl. 117—93)

This invention relates to a method for coating materials with liquid and in particular to the coating of fibrous roving with a resinous bonding material.

This application is a division of the inventor's co-pending application, Serial No. 438,766, filed June 23, 1954, now Patent No. 2,865,324, and entitled "Apparatus and Method of Applying Coating Material to Articles."

Fibrous roving, such as that made from glass fibers, consists of thousands of small diameter fibers which are combined in the form of a strand or a cord. In the manufacture of fiber glass reinforced resin products, the fibrous glass roving is coated with a liquid resinous binding material which polymerizes to bind the fibrous material into an integral structure. Difficulty has arisen in the past in coating each of the fibers in the roving with resin in order to obtain the maximum strength from the materials. The roving is ordinarily coated by passing the same through a bath of liquid resin or by spraying or dripping the resin on the fiber glass article. By these conventional methods of application the outer fibers in the roving are adequately coated with resin, but the inner fibers in the roving are generally uncoated or poorly coated so that the full strength of the inner fibers will not be available in the bonded structure.

The present invention is directed to a method for impregnating the fibers in a roving or strand with high velocity liquid particles. By use of the method of the invention, the inner as well as the outer fibers are coated with the liquid or resin so that the maximum strength of the fibers is available.

The present invention, in general, comprises a hollow casing which houses a rotating disc. The resin material is fed onto the upper surface of the disc adjacent the center thereof and the rotating motion of the disc particlizes the resin and whirls the same outwardly. The fibrous roving or other material to be coated passes tangentially to the edge of the disc and the particles of resin departing from the disc at high speeds strike the roving and penetrate deeply therein to coat all of the fibers. Heat may be applied to the lower surface of the disc to maintain the resin at the optimum viscosity for the operation.

The flow of resin across the disc is controlled by an inverted cone which is spaced upwardly from the disc to provide an annular clearance between the cone and the disc. The resin is required to pass through the clearance as it is whirled outwardly on the disc and this serves to meter or control the flow of the resin.

The discharge of the resin particles from the periphery of the disc is controlled by an electrostatic field. A plurality of charged segments are disposed in the casing adjacent the periphery of the disc. The segments are given an electric charge and the resin particles are given a like charge so that the particles will be repelled by the segments and the rate of discharge of the particles in the areas of the disc adjacent the segments will be reduced. The roving or other material to be coated is given the opposite charge from that of the particles so that the resinous particles will be attracted to the roving. In effect, this provides a controlled discharge of resin from the disc toward the roving and a decreased discharge of resin at other positions within the casing.

As the particles of resin are discharged from the disc at extremely high particle pressures, the resin is driven into the roving and effectively coats all of the inner fibers.

With use of the rotating disc which generates high speeds, resins having a short pot life can be employed and extremely reactive catalysts can also be used. The present apparatus is designed for use with either solid or liquid resin and in either case the flow of resin is controlled to provide a uniform coating of the material.

The drawing furnished herewith illustrates the best mode of carrying out the invention as presently contemplated and set forth hereinafter.

In the drawing:

FIGURE 1 is a vertical section of the apparatus of the present invention; and

FIG. 2 is a horizontal section of the apparatus of FIGURE 1.

The drawing illustrates an apparatus for coating a material, such as fibrous glass roving, with a liquid substance. The apparatus comprises a plurality of circularly spaced frame members 1 which are secured in an upstanding relation on foundation 2 and support a generally circular hollow casing 3.

The casing 3 comprises a generally conical lower section 4 and a generally circular upper section 5 which are joined at their peripheral edges by a plurality of bolts 6. The casing 3 is provided with a pair of passages 7 which extend generally tangentially to the casing. The passages 7 are disposed at diametrically opposite sides of the casing and are provided as a part of the casing and have a generally circular cross-sectional configuration.

A fibrous roving 8 or strand is adapted to move through the respective passages 7 from a reel to a winding head or mechanism, neither of which is shown, which winds the roving into the desired shape of the object to be manufactured. The roving may be composed of any fibrous material, such as glass, synthetics, cotton or wool, which is desired to be coated with a liquid binding material.

The invention provides a mechanism for centrifugal application of the liquid binding material to the roving. This mechanism comprises a vertical shaft 9 journaled within a pair of bearings 10 which are secured within aligned axial openings in the sections 4 and 5 of casing 3. The shaft is secured against vertical movement within the bearings 10 by nuts 11 which are threadedly engaged with the upper and lower ends respectively of the shaft. The shaft is driven by a motor 12 which is connected to the lower end of the shaft by a belt drive 13. A generally circular disc 14 is secured to shaft 9 by pin 15 and is adapted to rotate with the shaft.

A resin or other material to be employed in centrifugally coating the roving 8 by disc 14 is contained within a tank 16 which is supported above the casing 3 by legs 17. The resin from tank 16 is adapted to be fed through nozzle 18 onto the upper surface of disc 14 adjacent the center thereof. The resin is particlized by the rotary motion of the disc and whirled outwardly toward the roving 8 which is moving through passage 7 in casing 3. The resin departs from the disc at high speeds and it is possible to generate effective particle pressures of 25,000 to 50,000 p.s.i. at the periphery of the disc. These particle pressures are utilized to drive the resin particles deeply into the roving 8 as it passes through passage 7 to effectively coat the inner fibers within the roving.

The disc 14 may either be flat or slightly conical, as shown in FIGURE 1. The slightly conical shape of the disc prevents splattering of the resin and directs the resin particles outwardly against the roving in a well defined stream so that a greater proportion of the stream of resin particles will be directed into the roving.

The resin is fed onto the disc adjacent the center thereof at a low velocity region in order to minimize splashing. The nozzle itself may either be a jet or small diameter tubing and the resin introduced through nozzle 18 may either be a liquid resin or in the form of solid particles.

The resin on disc 14 may be heated by any conventional means to control the viscosity of the resin. As shown in FIGURE 1, the heating is accomplished by an induction heating coil 19 which is supported beneath disc 14 by a plurality of legs 20 which are secured to the lower section 4 of casing 3. An electrical lead 21 extends through an insulated opening 22 in section 4 and supplies current to the coil 19. If a solid resin is employed, heating is necessary to liquify the resin and if a liquid resin is employed, the heating may not be necessary, depending on the viscosity of the liquid resin.

To control the flow of the resin across the surface of disc 14, a cone 23 is secured to the upper bearing 10. The apex of cone 23 faces upwardly and the base edge of the cone is spaced from the upper surface of disc 14 to provide an annular clearance 24 therebetween.

If a solid resin is employed, the cone 23 serves as a holding nozzle and holds the solid resin back until it is liquified and then meters the liquid resin through the clearance 24. The solid resin is forced outwardly against the surface of cone 23 by centrifugal force, thereby creating optimum heat transfer conditions and enabling the resin to be melted very rapidly. The liquid resin is then removed from the heated zone through clearance 24 before any heat degradation can occur.

If a liquid resin is employed, the cone and clearance 24 provide a metering device or flow control which regulates the flow of the resin outwardly across the disc.

In either the case of a liquid or solid resin, the cone 23 serves to effectively control the flow of liquid resin and prevents heat degradation of the same. Because of this, resins having short pot life can be employed with this apparatus. Also, extremely active catalysts can be used because of the rapidity in melting and moving the heated liquid resin across the disc and into contact with the roving 8.

The cone 23 can be fixed with respect to the disc, as shown in the drawings, or it can rotate with the disc. If a solid resin is employed, a fixed cone 23 helps to shear or break up any resin particles that may attempt to pass through clearance 24 so that only fine resin particles will be discharged from the disc.

To collect the unused resin which is discharged against the inner wall of the casing, a plurality of openings 25 are provided in lower section 4 adjacent the axis thereof. The unused resin flows downwardly on section 4, through openings 25, and is collected in trough 26 which is secured to the lower bearing 10.

To direct the departure of the resin particles toward the roving 8 and decrease the departure of the resin at other portions of the casing 3, arcuate banks of plates 27 are secured to the inner wall of casing 3 between the passages 7. Each of the plates 27 is insulated from the adjacent plates and from the casing wall by an insulating material 28. Individual electrical leads 29 extend through suitably insulated openings 30 in casing 3 and are connected to the plates 27. Electric current flowing through leads 29 provides each of the plates with an electrostatic charge. Each of the plates 27 is charged individually so that the magnitude of the charge may vary throughout each bank of plates.

The resin particles on disc 14 are given an electrostatic charge by positioning a brush 31 against a collector ring 32 on shaft 9. Current through lead 33 of brush 31 charges the shaft 9, disc 14 and the resin particles moving across the disc. Normally all the plates are given a like charge and the resin particles are also given the same charge so that the particles are repelled by the plates and this will tend to prevent discharge of the particles toward the plates.

To increase the rate of discharge of the resin particles into passage 7 for effectively coating roving 8, the roving is electrically charged by passing through a cone 34 which is secured within passage 7 and insulated therefrom by insulation 35. A lead 36 extends through an insulated opening in casing 3 and is connected to the cone 34. The roving passing through cone 34 is given an electrical charge opposite of that of the resin particles so that the particles are attracted toward the roving and will be driven therein.

The resin particles are centrifugally cast from the disc 14 in a general tangential path. To increase the sector of discharge of the particles into passage 7, the portion of casing 3 adjacent the passage may be cut back, as indicated by 37. As shown in FIG. 2, the particles departing from the sectors A—B and C—D of the disc are discharged into the passage 7 and contact roving 8. Generally, the plates indicated by 38 adjacent the sectors A—B and C—D have the least charge, and the charge is progressively increased throughout each bank of plates with the plate at the opposite end of the bank, indicated by 39, having the greatest charge. Thus, the particles will be strongly repelled by the plates 39 and will build up along the periphery of the disc 14. As the plates 38 have a small charge or perhaps no charge, the particles will be discharged from the disc as they approach these plates.

It is contemplated that the end plates indicated by 38 may be given the opposite charge to that of the resin particles so that the particles will be attracted by the plates 38 and the path of the particles will be deflected outwardly from the uusal tangential path. By employing an opposite charge on plates 38 to that of the particles, it is possible to increase the size of the sectors A—B and C—D from which the resin particles are discharged.

Through use of the electrostatic charges it is possible to direct a greater proportion of the resin particles into passage 7 and decrease the discharge of particles at other portions within the casing. By decreasing the discharge of particles at these other portions, a more effective use of the resin results and the waste of resin is reduced.

The present invention, by employing the rotating disc 14, has very low power requirements due to the whirling type operation, but develops extremely high velocity and high effective pressures which result in an excellent impregnation of the roving and a homogeneous coating of the fibers.

The present apparatus is designed to handle either liquid or solid resins and effectively controls the flow of either material without adjustment in the structure. It is also contemplated that milled or short fibrous material may be included in the resin and cast with the resin into the roving or other article moved by the centrifugally casting disc or corresponding casting means. Due to the speed of the resin particle driven on disc 14, short pot life resin can be used and highly reactive catalysts may be employed.

While the description of the invention is directed to the impregnation of fibrous roving with a resin material, it is contemplated that the present apparatus may also be employed to coat sheet material, tubular objects, storage vessels, etc. The apparatus is particularly adaptable to the coating of materials which are difficult to thoroughly or fully coat, such as materials having a deep pile or articles of a thick fibrous nature.

The resin used to coat the winding material may take the form of a thermosetting polyester resin such as a polyester resin in which at least one of the reactants contains an unsaturated double bond in an aliphatic group. For example, the unsaturated bond may be in the polybasic acid component such as when maleic acid or anhydride is reacted with a polyhydric alcohol such as glycerol, ethylene glycol, diethylene glycol, propylene glycol, sorbitol, mannitol, pentaerythritol, polyethylene glycol and the like. In addition thermosetting resins of the dialylphthalate, epoxide, furane and vinyl types may also be employed as the resin coating for the fibrous material.

However, it is contemplated that any other liquid coating material or material capable of being particlized may also be employed with this apparatus to coat the article.

Various modes of carrying out the invention are contemplated as being within the scope of the following claims particularly pointing out and distinctly claiming the subject matter which is regarded as the invention.

I claim:

1. A method of impregnating a fibrous strand with a liquid thermosetting resin, comprising the steps of introducing a solid resin onto the upper surface of a rotatable member, heating the solid resin to melt the same, rotating the member to particlize the resin and centrifugally cast the same outwardly across the surface of the member, and passing the fibrous strand tangentially immediately adjacent the periphery of the member with the particlized resin contacting the strand with high particle pressures to impregnate said strand with liquid resin.

2. A method of impregenating a fibrous strand with a liquid thermosetting resin, comprising the steps of passing the fibrous strand tangentially adjacent the periphery of a generally horizontal rotatable member, continually introducing divided solid resin onto the upper surface of the rotatable member, heating the resin on the rotatable member to melt the same, rotating the rotatable member to particlize the melted resin and centrifugally cast the same outwardly across the surface of the member, and confining the divided solid resin adjacent the center of the rotatable member while metering the melted resin outwardly across the surface of the member in a thin stream and into contact with the strand to impregnate the same.

3. A method of impregnating a fibrous strand with a liquid thermosetting resin, comprising the steps of passing the fibrous strand tangentially adjacent the periphery of a generally horizontal rotatable member, continually introducing divided solid resin onto the upper surface of the rotatable member, heating the resin on the rotatable member to melt the same, rotating the rotatable member to particlize the melted resin and centrifugally cast the same outwardly across the surface of the rotatable member, confining the divided solid resin adjacent the center of the rotatable member while metering the melted resin outwardly across the surface of the member in a thin stream and into contact with the strand to impregnate the same, and applying an electrostatic charge to the resin and an opposite electrostatic charge to the strand to thereby attract the resin to the strand and increase the proportion of resin contacting the strand.

4. A method of impregnating an article with a liquid coating material, comprising the steps of passing the article substantially immediately adjacent the periphery of a rotatable member, introducing a divided solid resin onto the central portion of the upper surface of the rotatable member, applying heat to the resin on said rotatable member to melt the same, rotating the rotatable member to particlize the melted resin and centrifugally cast the same outwardly across the surface of the rotatable member, metering the melted resin outwardly in a thin stream across the surface of the rotatable member and into contact with the article to impregnate the same, and retaining the divided solid resin at the central portion of the member until said resin is melted.

5. A method of fabricating a resin-impregnated fibrous article, comprising supplying an uncured thermosetting resin to the upper surface of a rotatable disc, rotating the disc to particlize the resin and centrifugally cast the same outwardly across the surface of the disc, and passing a plurality of fibers in the form of a strand tangentially immediately adjacent the periphery of the disc and in the plane of the resin being discharged from the disc to drive the resin particles into the interior of the strand to coat the individual bers in the strand with resin.

References Cited in the file of this patent

UNITED STATES PATENTS

| 694,106 | Metcalf et al. | Feb. 25, 1902 |
| 1,022,956 | Lengerke et al. | Apr. 9, 1912 |
| 1,803,792 | Christensen | May 5, 1931 |
| 2,597,021 | Norris | May 20, 1952 |
| 2,680,079 | Huebner | June 1, 1954 |
| 2,754,226 | Juvinall | July 10, 1956 |
| 2,780,565 | Juvinall | Feb. 5, 1957 |
| 2,808,343 | Simmons | Oct. 1, 1957 |

FOREIGN PATENTS

| 982,327 | France | June 8, 1951 |

OTHER REFERENCES

"Ransburg No. 2 Process," Ransburg Electro-Coating Corp., Indianapolis, 1953, 16 pp.

UNITED STATES PATENT OFFICE
CERTIFICATE OF CORRECTION

Patent No. 2,987,419   June 6, 1961

George A. Stein

It is hereby certified that error appears in the above numbered patent requiring correction and that the said Letters Patent should read as corrected below.

Column 5, line 23, for "impregenating" read -- impregnating --; column 6, line 29, for "bers" read -- fibers --.

Signed and sealed this 21st day of November 1961.

(SEAL)
Attest:

ERNEST W. SWIDER
Attesting Officer

DAVID L. LADD
Commissioner of Patents
USCOMM-DC